(12) United States Patent
Pierce et al.

(10) Patent No.: US 6,264,220 B1
(45) Date of Patent: Jul. 24, 2001

(54) WHEELED TOOL CART WITH REMOVABLE TOOL HOLDER TRAY

(75) Inventors: Peter J. Pierce, St. Louis, MO (US); David Bardin, 11635 Brookford, Bridgeton, MO (US) 63132

(73) Assignee: David Bardin, Bridgeton, MO (US)

( * ) Notice: Subject to any disclaimer, the term of this patent is extended or adjusted under 35 U.S.C. 154(b) by 0 days.

(21) Appl. No.: 09/549,121

(22) Filed: Apr. 13, 2000

(51) Int. Cl.[7] .................................................. B62B 1/00
(52) U.S. Cl. ...................................... 280/79.3; 280/47.35
(58) Field of Search ............................. 280/79.11, 79.3, 280/47.35; 211/70.6, 133.1, 59.1; 206/372, 373; 312/902

(56) References Cited

U.S. PATENT DOCUMENTS

| | | | |
|---|---|---|---|
| 300,361 | * 6/1884 | Hale | 108/177 |
| 870,835 | * 11/1907 | Loew | 211/133.1 |
| 1,169,157 | * 1/1916 | Honold | 211/174 |
| 1,660,521 | 2/1928 | Nordgren . | |
| 2,835,503 | 5/1958 | Humphries et al. | 280/47.19 |
| 2,886,186 | * 5/1959 | Hamilton | 211/126 |
| 3,698,735 | 10/1972 | Bloomfield et al. | 280/47.35 |
| 3,759,538 | 9/1973 | Fabiano | 280/47.35 |
| 3,853,329 | * 12/1974 | McDonald | 280/47.35 |
| 4,037,851 | * 7/1977 | Romero | 280/79.3 |
| 4,068,855 | * 1/1978 | Hackett | 280/79.3 |
| 4,117,937 | 10/1978 | Ratti | 211/60 T |
| 4,119,044 | 10/1978 | Hines | 108/27 |
| 5,083,669 | 1/1992 | Wisehart | 211/70.6 |
| 5,372,265 | * 12/1994 | Munch | 211/187 |
| 5,588,659 | 12/1996 | Boes et al. | 280/47.19 |
| 5,887,878 | 3/1999 | Tisbo et al. | 280/47.19 |

FOREIGN PATENT DOCUMENTS

| | | | |
|---|---|---|---|
| 3604657A1 | * 8/1987 | (DE) | 280/79.3 |
| 2138751A | * 10/1984 | (GB) | 280/79.11 |

OTHER PUBLICATIONS

J&L Catalog, Storage Systems, Open Tool Trolley, 2000 (est. date) p. 1415B.
Lab Safety Supply Catalog, Storage Systems/Small Parts Storage, Flex Works Floor Stands, 2000 (est. date), p. 30.
MSC Catalog, Tool Chests & Roller Cabinets, 2000 (est. date) p. 3087–3090.

* cited by examiner

Primary Examiner—Brian L. Johnson
Assistant Examiner—G B Klebe
(74) Attorney, Agent, or Firm—Senniger, Powers, Leavitt & Roedel

(57) ABSTRACT

A cart, primarily for holding tools and miscellaneous other items, comprising a base tray on casters for being wheeled about, uprights extending up from the base tray carrying side trays and a removable top tray, and pegboards at opposite sides, components thereof being sized in such manner that, in disassembly, they can be compactly packaged in the base tray.

14 Claims, 9 Drawing Sheets

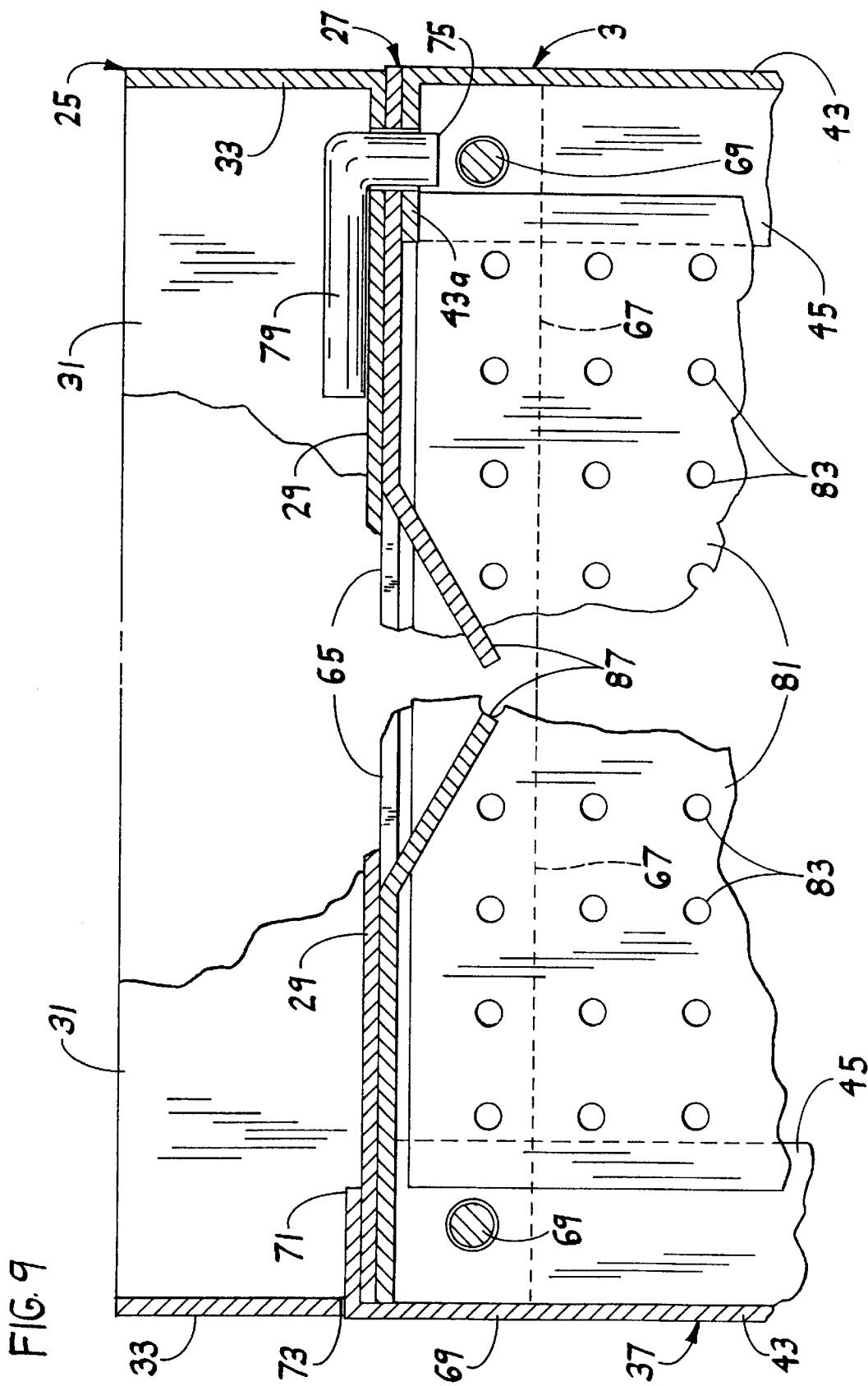

WHEELED TOOL CART WITH REMOVABLE TOOL HOLDER TRAY

BACKGROUND OF THE INVENTION

This invention relates to carts, more particularly to a cart for holding and organizing tools and miscellaneous other items.

The invention is especially concerned with a cart useful in the household for holding tools needed for work around the house and miscellaneous other items such as containers of fasteners (e.g. nails, screws), a can of oil, etc. It is to be understood, however, that the cart is not limited to household use; it may find use in various environments where work requiring tools and items such as mentioned are needed. Thus, among uses other than household use may be mentioned use in professional building maintenance, and use in auto repair shops, research and engineering centers and manufacturing plants.

BRIEF SUMMARY OF THE INVENTION

Among the several objects of the invention may be noted the provision of an improved cart (which may also be termed a "trolley" or "caddy") for holding tools and supplies organized and for transport thereof to whatever project where they may be needed; the provision of such a cart which may be configured to meet the user's specific tool and supply needs; the provision of such a cart with a holder for tools and/or supplies that may be readily taken off the cart for placement in proximity to work being carried out for even more convenience and readily put in place back on the cart; the provision of such a cart made up of components in such manner as to enable it to be supplied in disassembled manner for ultimate assembly, with the components such as to be compactly packaged for handling and shipping; the provision of such a cart the components of which are of relatively economical manufacture and readily assembled; and the provision of such a cart which, with minor alterations if needed, is capable of use for other than the stated tool holding and organizing purpose, such as use as a cleaning cart, as an easel and supplies organizer for artists, etc.

In general, a cart of this invention comprises a base which comprises a rectangular tray having a bottom, side walls and end walls with casters on the bottom thereof. Two uprights extend up from the base tray, one at each end wall, each narrower than and generally centered with respect to the respective end wall, the base tray extending out from the uprights on both sides thereof. Two side trays, one on each side of the uprights, extend from one upright to the other, being removably fastened thereto at a level between the lower and upper ends of the uprights. The uprights are formed for fastening the side trays at least at one other level. A top tray is removably mounted in place extending between the upper ends of the uprights.

Other objects and features will be in part apparent and in part pointed out hereinafter.

BRIEF DESCRIPTION OF THE DRAWINGS

FIG. 9 is an enlarged vertical section generally on line 9—9 of FIG. 8, broken away in the middle.

Corresponding reference characters indicate corresponding parts throughout the several views of the drawings.

DETAILED DESCRIPTION

Figure 5:
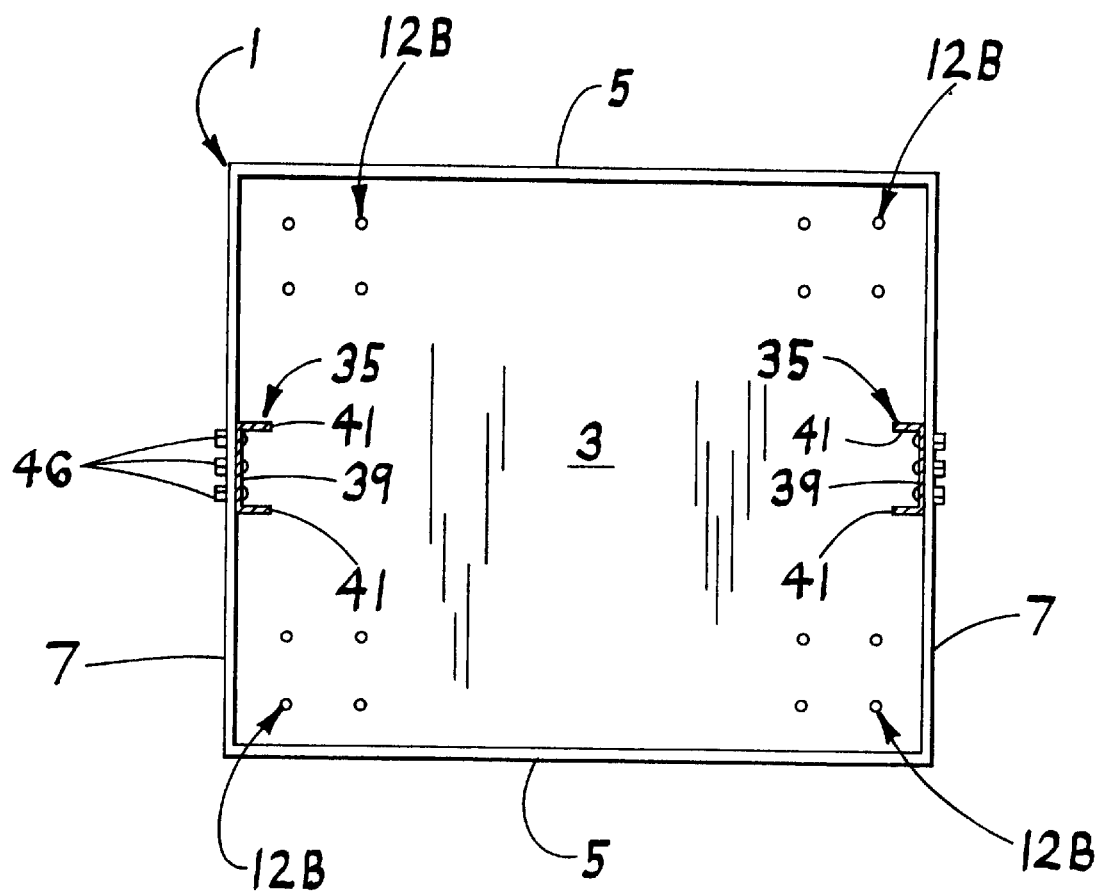
FIGS. 5, 6 and 7 are horizontal sections taken generally on lines 5—5, 6—6 and 7—7 of FIG. 1, FIGS. 6 and 7 being enlarged.

Referring to the drawings, a cart C of this invention is shown to comprise a base comprising a rectangular tray 1 having a flat bottom 3, vertical side walls each designated 5 and vertical end walls each designated 7. This tray may be, e.g., about 25.5 inches long, 21.25 inches wide and 5.0 inches high, being made in one piece of sheet metal, e.g. 18 gauge cold rolled steel. Other parts to be subsequently mentioned are made of the same sheet metal unless otherwise characterized. The cart is adapted to be rolled on two casters 9 on the underside of the bottom of the tray 1 at the two corners of the tray at one end thereof, which may be referred to as the rear end of the tray (and the cart), and two casters 11 on the underside at the two corners at the other end, which may be referred to as its forward or front end. Each of rear casters 9 has a wheel 9W, which may be steerable but is shown as non-steerable; each of front casters 11 has a steerable wheel 11W and may have a locking feature 11L of suitable well-known type. Each caster has the usual head 12 suitably secured, as by being bolted, to the bottom 3 on the underside thereof by bolts as indicated at 12B in FIG. 5.

Two uprights, each designated 13 in its entirety, extend up from the base tray 1, one at each end wall 7 of the base tray, each narrower than and generally centered with respect to the respective end wall 7, the base tray extending out from the uprights on both sides thereof.

Two side trays, each designated 15, are mounted on the uprights 13, one on each side of the cart, each extending from one upright to the other and removably fastened thereto at a level between the lower and upper ends of the uprights. Each side tray has a flat bottom 17, inside and outside vertical side walls 19 and 21 and vertical end walls each designated 23. Each side tray has a width of about 3 inches, for example, (about 0.28 times the width of the base tray 1), its outside wall thereby being in a vertical plane spaced inward from the vertical plane of the respective side wall 5 of the base tray, being made in one piece of sheet metal like the base tray. Each side tray 15 is preferably of slightly less length than the base tray 1 so as to be able to be placed therein for the supply of the cart in disassembly in compactly packaged manner, and may be about 3.63 inches high, for example. The uprights 13 are formed, as will be subsequently described, for fastening the side trays at least at one other level.

The uprights 13 also have a tray 25 removably mounted in place at the top of the cart on a header 27 extending between the upper ends of the uprights. This top tray has a flat bottom 29, vertical side walls 31 and vertical end walls 33, being formed in one piece of sheet metal like the other trays and of a length like the side trays 15 for fitting in the base tray 1. It may be, for example, about 8.125 inches wide and 1.25 inch high, and provided at the center of the bottom 25 with a handle H.

Each upright 13 is of two-piece construction, comprising a lower member 35 extending up from the base tray 1 about half the height of the cart and an upper member 37 extending up from the lower member 35 generally for the remainder of the height of the cart. Each lower upright member 35 is constituted by a sheet metal channel, the web of which is designated 39 and the flanges of 15 which are designated 41; similarly each upper upright member 37 is constituted by a sheet metal channel comprising a web 43 and flanges 45. The web 43 of upper upright member has an inturned upper end 43a. The channels which constitute the lower and upper upright members 35 and 37 extend up from the base tray I with their open sides inward, the webs 39 of the lower members 35 engaging the insides of the end walls 7 of the base tray 1 and being bolted thereto by bolts 46. Each of the lower and upper upright channels 35 and 37 is formed in one piece of sheet metal (preferably the same 18 gauge cold rolled steel as the trays) of such length as to fit lengthwise in the base tray. For example, each of members 35 and 37 is 20.75 inches long, member 35 is 3.125 inches wide and member 37 is 3.00 inches wide (to fit within member 35), each having one inch wide flanges. Each upper upright member 37 has a lower end portion 47 (e.g., about the lower three inches thereof) fitted in the upper end of the respective lower upright member 35 and removably secured therein by long bolts as indicated at 49. These bolts also removably secure the side trays 15 in place, and additionally serve to secure a brace 51 extending between the lower ends 47 of the upper upright members 37 holding the spacing of the uprights 13.

The brace 51, which may also be referred to as a spacer or stretcher, is constituted by a sheet metal channel having a web 53 and flanges 55 (preferably formed in one piece of the same 18 gauge cold rolled steel as previously mentioned) of such length as to fit lengthwise in the base tray 1. For example, the brace may about 25.25 inches long and about 3 inches wide for its ends to fit within the lower ends of members 37. Brace 51 is removably secured in place with its web 53 down, and its flanges 55 (which may, for example be 1 inch flanges) extending up.

Figure 1:
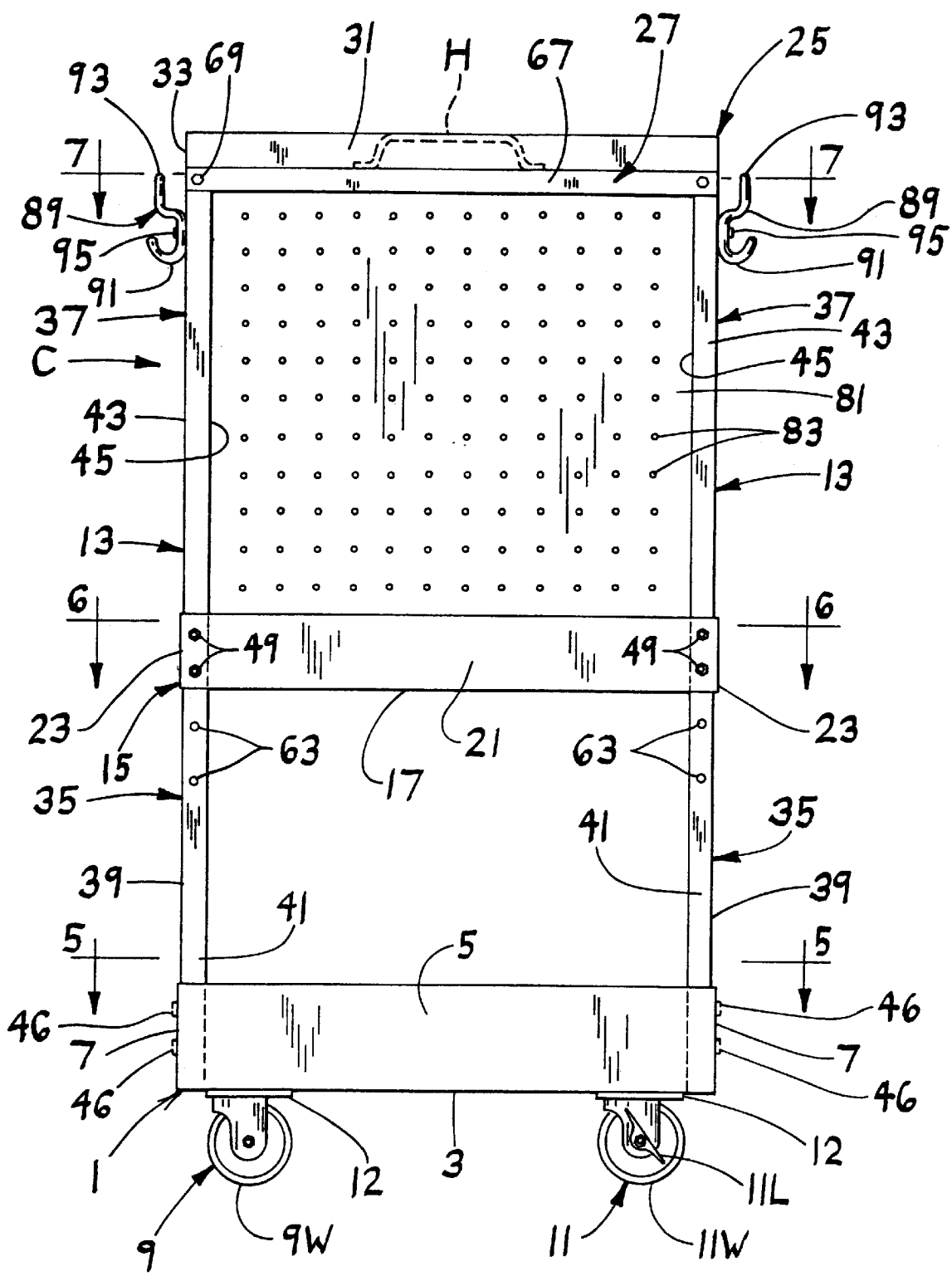
FIG. 1 is a view in elevation of one side of a cart of this invention, the other side appearing much the same.
Figure 2:
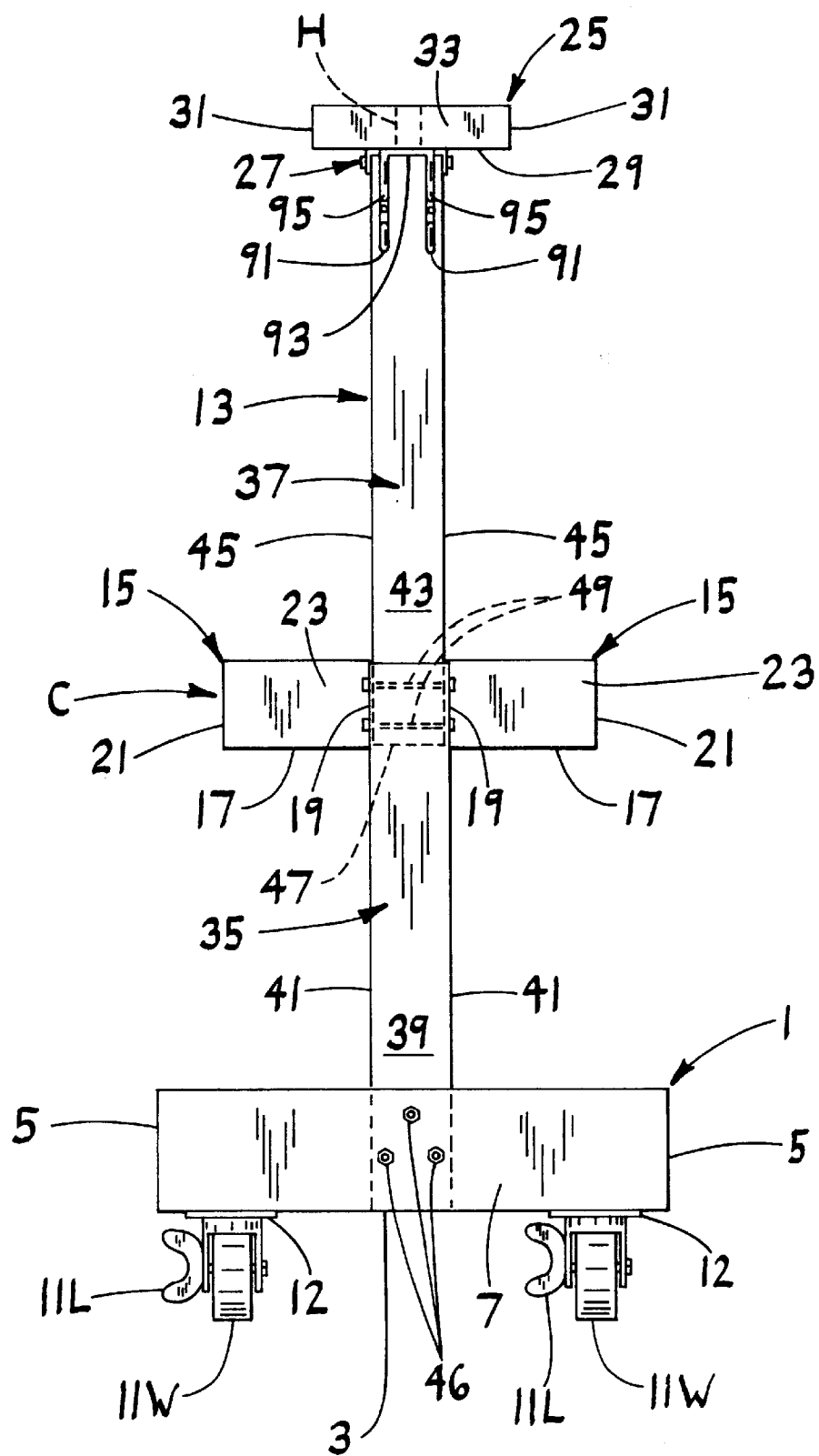
FIG. 2 is a view in elevation of one end of the cart, the other end appearing much the same.
Figure 3:
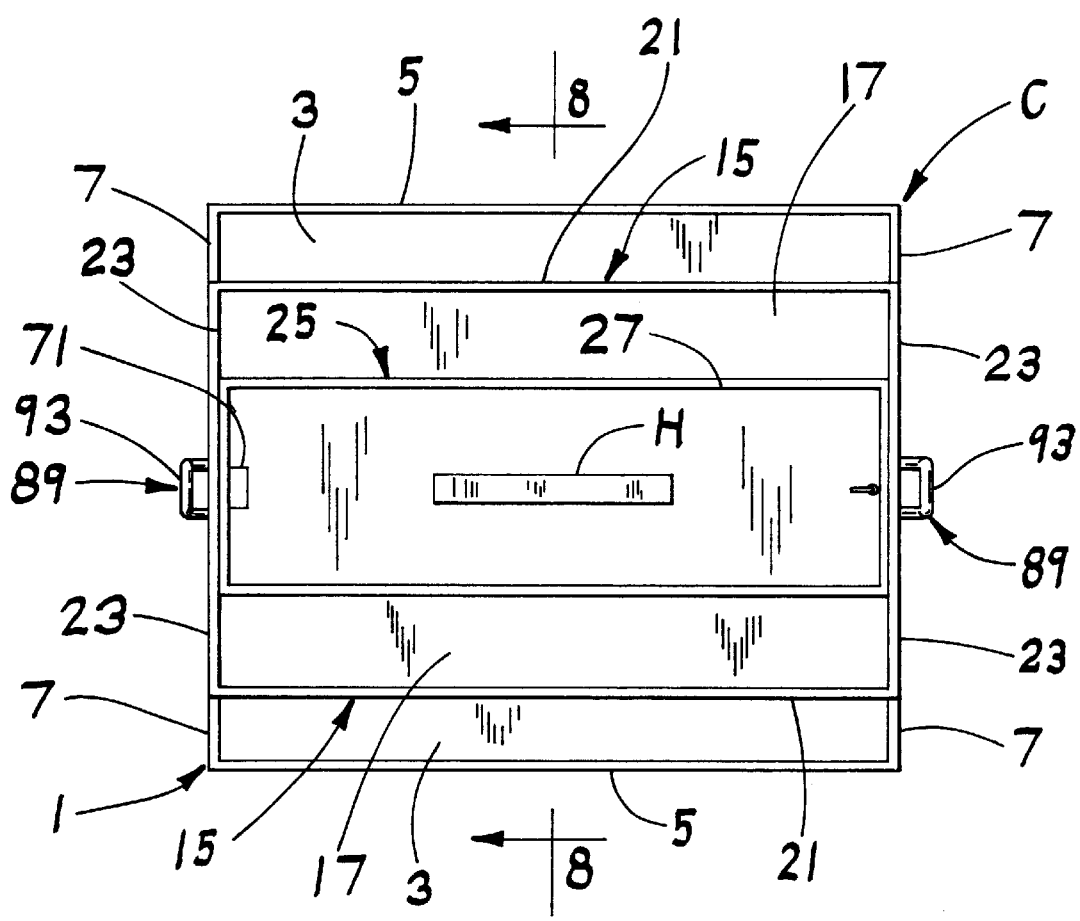
FIG. 3 is a plan view.
Figure 4:
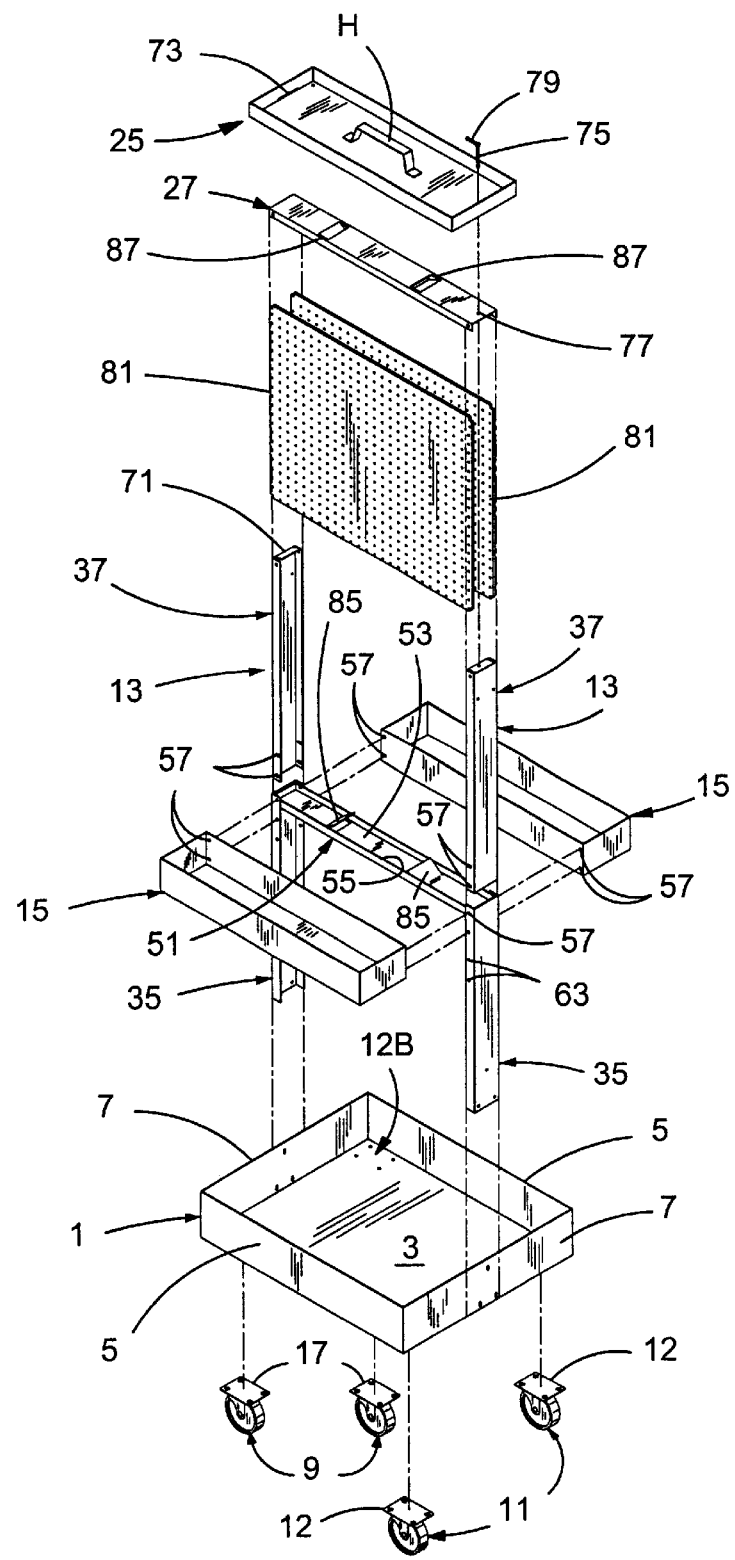
FIG. 4 is an exploded view showing component parts making up the cart, some parts being omitted.
Figure 6:
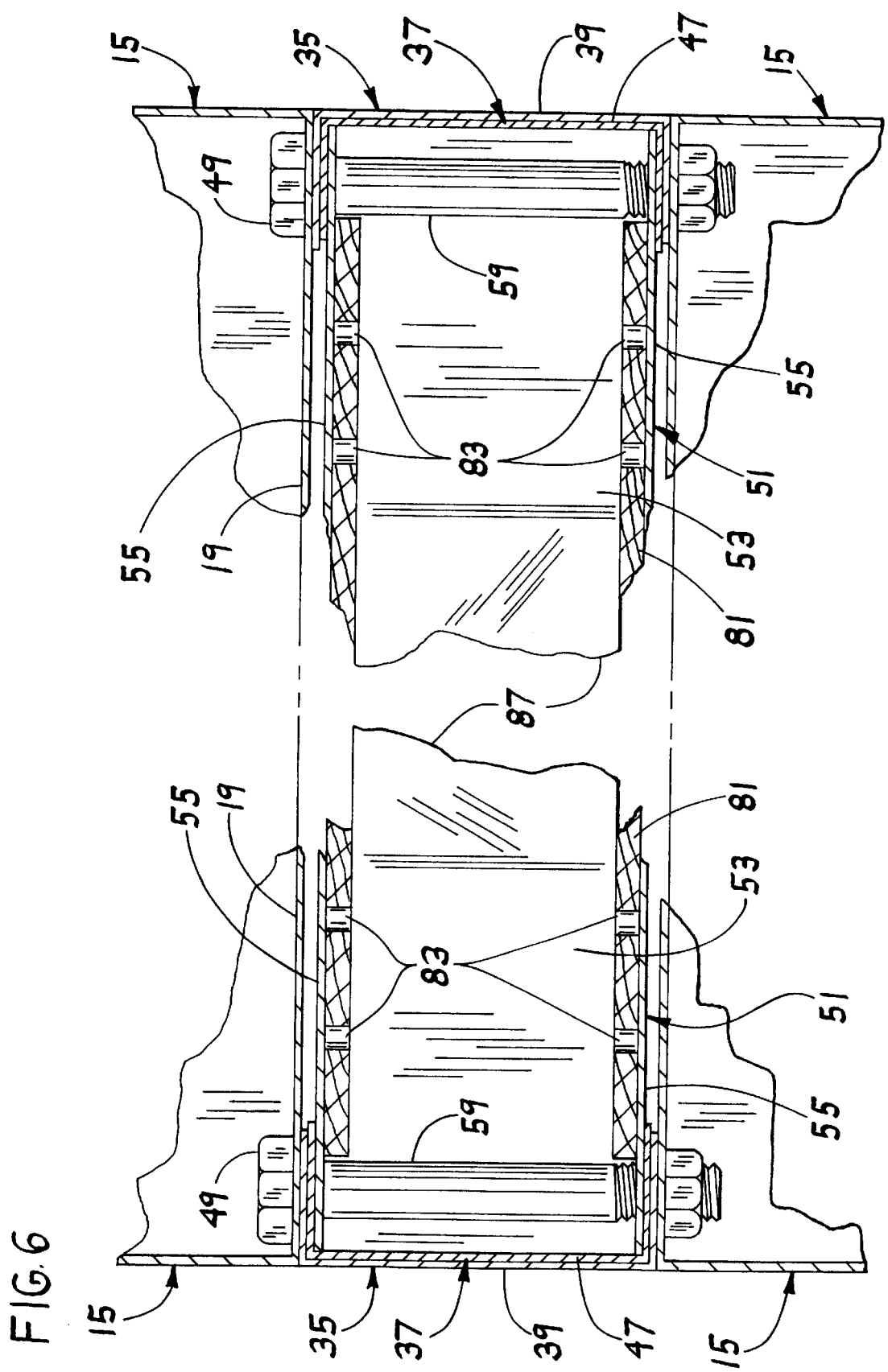
Figure 7:
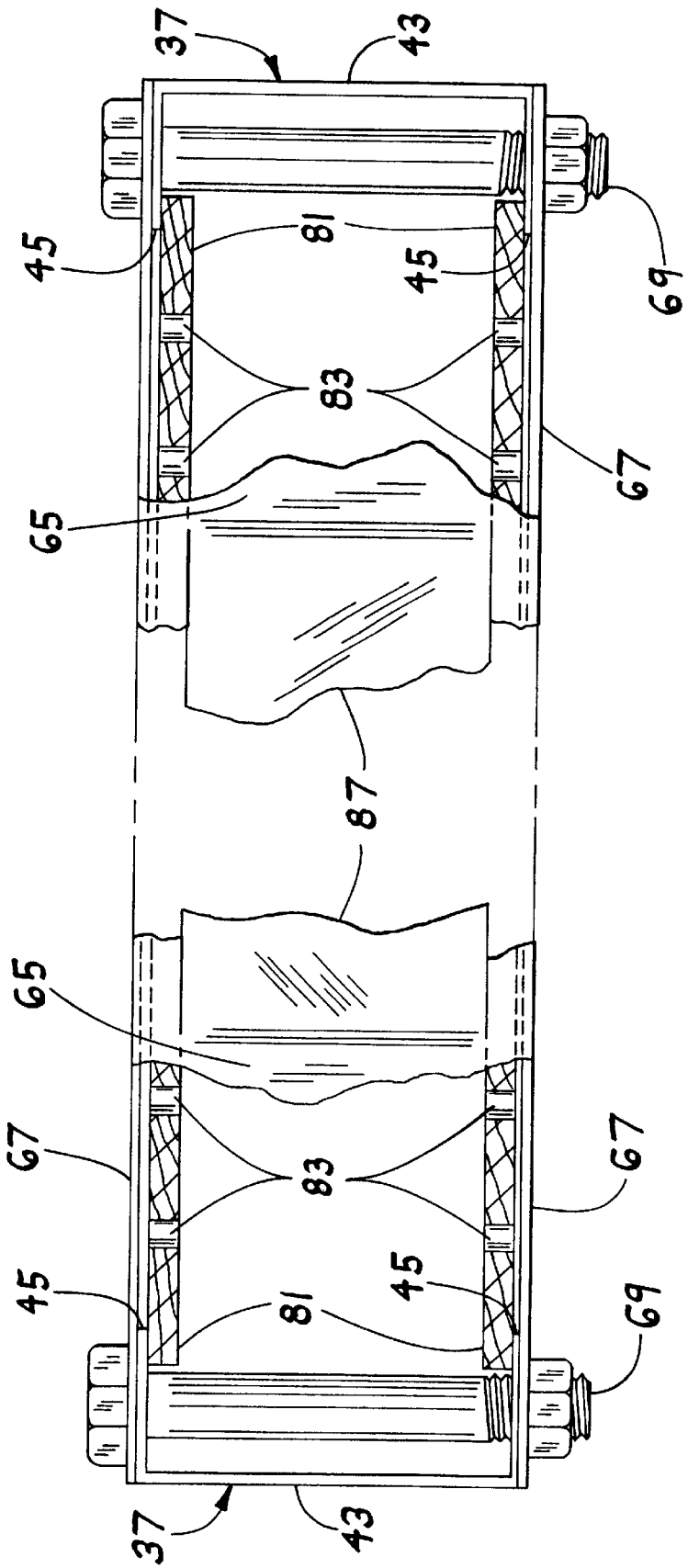

The inside side wall 19 of each side tray, the upper ends of flanges 41 of each lower upright member 35, the lower ends of each upper upright member 37 are each provided with sets of two bolt holes 57 each (see FIG. 4) and the ends of flanges 55 of the brace 51 are each provided with a single bolt hole 59 (see FIG. 6) for bolts 49, serving to removably mount the side trays 15 at an uppermost level therefor at the upper end of the lower upright member 35 of the uprights 13. The flanges 41 of the lower members 35 of the uprights are formed for fastening the side trays 15 at least at one of a number of lower levels, by being provided below the lower of the bolt holes 57 therein additional bolt holes 63 enabling placement of the side trays 15 at any one of said levels if so desired using bolts in addition to those securing together the members 35 and 37 of the uprights 13 and the brace 51.

Figure 8:
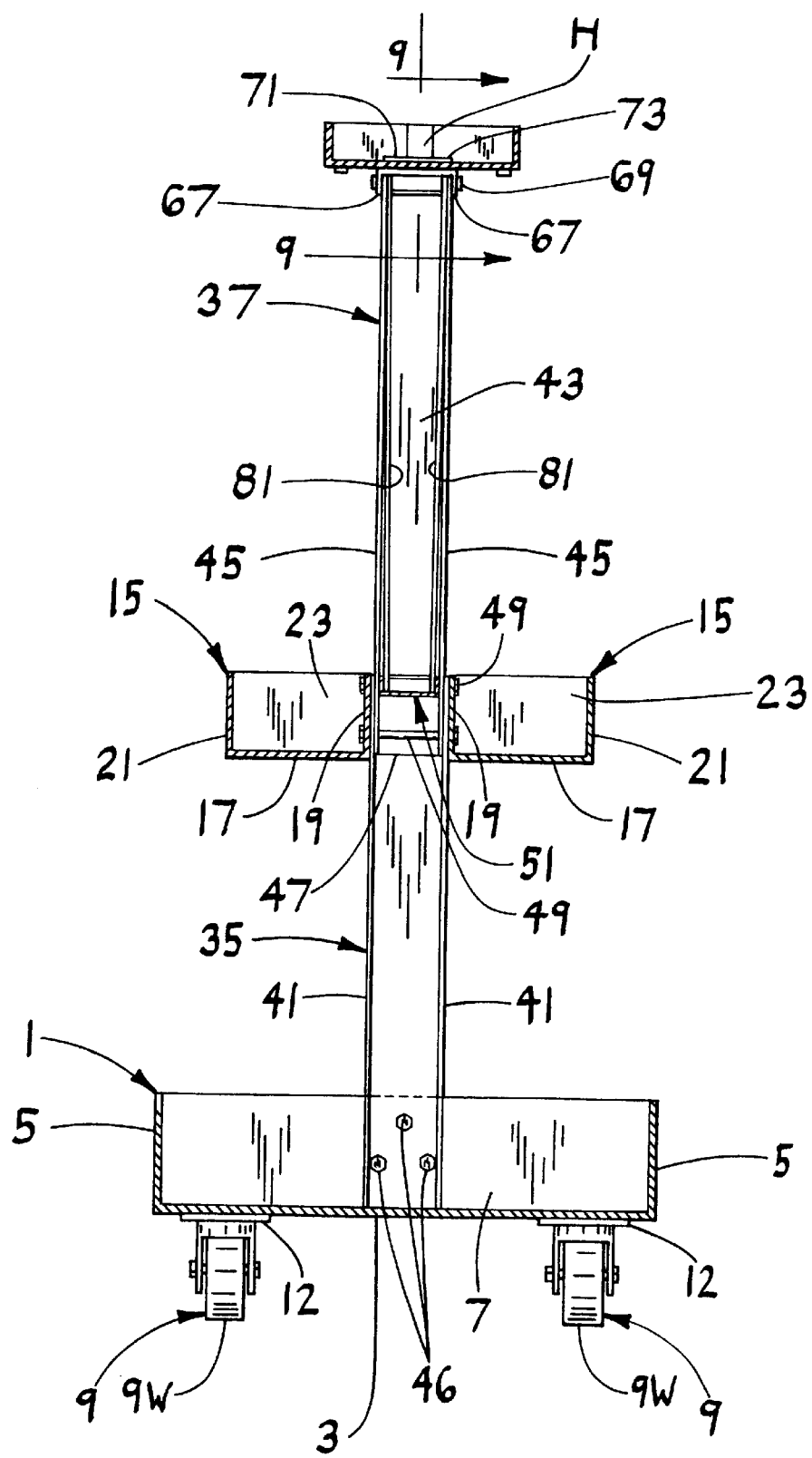
FIG. 8 is a vertical section generally on line 8—8 of FIG. 3.

The header 27 is constituted by a sheet metal channel having a web 65 and flanges 67 (preferably formed in one piece of the same 18 gauge cold rolled steel as other parts above mentioned) of such length as to fit endwise in the base tray 1. For example, the header may be about 25.25 inches long, about 3 inches wide (i.e. somewhat wider than channels 37) with 1.25 inch flanges. It is fitted at its ends on the upper ends of the upper upright members 37, its web 65 up and its flanges 67 lying on the outside of flanges 45 of members 37 and being removably fastened thereto as by bolts indicated at 69. At one end of the header 27, e.g. its rearward end, its web 65 has a tab 71 (see FIGS. 8 and 9) bent up and extending forward for reception in an opening constituted by a slot 73 in the rearward end wall 33 of the top tray 25 centered with respect to said end wall for guidance in placement of the top tray 25 on the header in centered relation. This arrangement is such as to enable the top tray 25 to be moved in rearward direction for reception of the tab 71 in the slot 73 for placement of the top tray on the flat generally horizontal web 65 of the header 27 centered in the lateral aspect with respect thereto, after which the top tray may be held against sliding off center by means of dowel pin 75 entered in registering holes at 77 in the bottom of the top tray, in the web 65 of the header 27. The pin 75 has a head 79.

Two pegboards each designated 81 are provided, one for each side of the cart, in the space bounded at the sides by the upper members 37 of the uprights 13, at the bottom by the brace 51 and at the top by the header 27. Each pegboard is constituted, for example, by a rectangular piece of ¼ inch Masonite having the usual perforations 83 for the usual pegboard hardware for hanging tools etc., measuring for example, 25 by 21 inches so as to fit in the base tray 1 along with other parts for supplying the cart in disassembled or knocked-down condition for the ultimate assembly thereof by the end user. One pegboard is disposed on the inside of those flanges 45 of the upper upright members 37 at one side of the cart and the other is disposed on the inside of those flanges 45 of member 37 at the other side of the cart, being held in engagement with the flanges 45 by means of tabs 85 struck up out of the web 53 of the brace 51 and tabs 87 struck down out of the web 65 of the header 27.

Members indicated in their entirety by the reference numeral 89 each comprising a pair of hooks 91 and a handle 93 are secured as by rivets 95 on the outside of the webs 43 of members 37 adjacent the upper ends thereof.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cart comprising:

a rectangular base tray having a bottom, side walls and end walls;

casters on the bottom of the base tray;

two uprights extending up from the base tray, one at each end wall and each narrower than and generally centered with respect to the respective end wall, the base tray extending out from the uprights on both sides thereof;

two side trays, one on each side of the uprights, each having a bottom, side walls and end walls, each extending from one upright to the other with one of its side walls in engagement with the uprights and removably fastened thereto at a level between the lower and upper ends of the uprights;

said uprights being formed for fastening the side trays at least at one other level and having a header spanning the upper ends of the uprights and secured thereto and a top tray removably mounted in place extending between the upper ends of the uprights, said top tray being removably mounted on the header.

2. A cart as set forth in claim 1 having two pegboards mounted on opposite sides of the cart extending heightwise from adjacent the level of the side trays to adjacent the header.

3. A cart comprising:

a rectangular base tray having a bottom, side walls and end walls;

casters on the bottom of the base tray;

two uprights extending up from the base tray, one at each end wall and each narrower than and generally centered with respect to the respective end wall, the base tray extending out from the uprights on both sides thereof;

two side trays, one on each side of the uprights, each extending from one upright to the other and removably fastened thereto at a level between the lower and upper ends of the uprights;

said uprights being formed for fastening the side trays at least at one other level;

a top tray removably mounted in place extending between the upper ends of the uprights;

a header spanning the upper ends of the uprights and secured thereto, said top tray being removably mounted on the header;

two pegboards mounted on opposite sides of the cart extending heightwise from adjacent the level of the side trays to adjacent the header;

wherein each upright comprises a lower upright member extending up from the base tray about half the height of the cart and an upper upright member extending up from the lower member to said header, the latter spanning the upper ends of said upper upright members.

4. A cart as set forth in claim 3 having a brace extending between the uprights at the upper ends of the lower upright members and the lower ends of the upper upright members.

5. A cart as set forth in claim 4 wherein each tray is a one-piece sheet metal tray each having a bottom wall, side and end walls, and wherein each of the lower and upper upright members comprises a sheet metal channel member each having a web and flanges, each lower upright member at its lower ends being disposed on the inside of the respective end wall of the base tray with its web engaging said end wall and fastened thereto.

6. A cart as set forth in claim 5 wherein each upper upright member is fitted at its lower end in the upper end of the respective lower upright member with its flanges extending inwardly.

7. A cart as set forth in claim 5 wherein the brace and the header are each one-piece sheet metal channel members each having a web and flanges, the header extending generally horizontally between the upper ends of the upper of the upper upright members with its web up and flanges directed down.

8. A cart as set forth in claim 7 wherein the brace extends between the uprights with its web down and flanges directed up.

9. A cart as set forth in claim 8 wherein each pegboard is generally rectangular, one being disposed on the inside of the flanges of the upper upright members, the brace and the header at one side of the cart, and the other being disposed on the inside of the other flanges of the upper upright members, the brace and the header at the other side of the cart.

10. A cart as set forth in claim 9 wherein the pegboards are held in place in engagement with the said flanges by means of tabs struck down from the web of the header and struck up from the web of the brace.

11. A cart as set forth in claim 3 wherein one of the removable top tray and header has an opening and the other a part receivable in the opening for centering the removable top tray on the header.

12. A cart comprising:

a rectangular base tray having a bottom, side walls and end walls;

casters on the bottom of the base tray;

two uprights extending up from the base tray, one at each end wall and each narrower than and generally centered with respect to the respective end wall, the base tray extending out from the uprights on both sides thereof;

two side trays, one on each side of the uprights, each extending from one upright to the other and removably fastened thereto at a level between the lower and upper ends of the uprights;

said uprights being formed for fastening the side trays at least at one other level;

a top tray removably mounted in place extending between the upper ends of the uprights;

a header spanning the upper ends of the uprights and secured thereto, said top tray being removably mounted on the header;

wherein one of the removable top tray and header has an opening and the other a part receivable in the opening for centering the removable top tray on the header; and wherein the opening is a slot in one end wall of the removable tray and said part is a tab bent up from the header at one end thereof and extending over the web of the header.

13. A cart as set forth in claim 4 wherein the base tray, the lower and upper upright members, the side trays, the top tray, the header, the brace, and the pegboards are dimensioned for supplying these parts for a cart in disassembly with the lower and upper upright members, side and top trays, header, brace and pegboards in the base tray.

14. A cart as set forth in claim 10 wherein the base tray, the upright members, the side trays, the top tray, the header, the pegboards and the brace are dimensioned for supplying a set of these parts for a cart in disassembly with the upright members, side and top trays, header, pegboards and brace in the base tray.

* * * * *